United States Patent

[11] 3,607,661

| [72] | Inventors | Alexandr Cerny<br>Kyje U Prahy;<br>Otto Grubner, Praha, both of<br>Czechoslovakia |
|---|---|---|
| [21] | Appl. No. | 757,406 |
| [22] | Filed | Sept. 4, 1968 |
| [45] | Patented | Sept. 21, 1971 |
| [73] | Assignee | Ceskoslovenska akademie ved<br>Praha, Czechoslovakia |
| [32] | Priority | Sept. 5, 1967 |
| [33] | | Czechoslovakia |
| [31] | | 6327-67 |

[54] LABORATORY DISTILLATION COLUMN WITH FREELY MOVEABLE BUBBLE PLATES
3 Claims, 3 Drawing Figs.

[52] U.S. Cl. .................................................. 202/158,
203/DIG. 2, 203/86, 261/114
[51] Int. Cl. .................................................. B01d 3/20
[50] Field of Search .................................................. 202/158;
65/108; 261/114, 114.1; 203/86, DIG. 2; 23/253, 292

[56] References Cited
UNITED STATES PATENTS

| 1,583,464 | 5/1926 | Houskeeper | 65/108 |
|---|---|---|---|
| 2,464,765 | 3/1949 | Palmer | 65/108 |
| 2,776,822 | 1/1957 | Ortegren et al. | 202/158 |
| 2,789,803 | 4/1957 | Doty | 202/158 |
| 2,809,820 | 10/1957 | Stoops | 202/158 |
| 3,091,105 | 5/1963 | Morrill | 65/110 |
| 3,262,684 | 7/1966 | Smith | 261/114 |

FOREIGN PATENTS

| 844,371 | 8/1960 | Great Britain | 261/114 |
|---|---|---|---|
| 1,350,364 | 12/1963 | France | 261/114 |

OTHER REFERENCES
Scientific & Industrial Glass Blowing & Laboratory Techniques: Barr et al. Instrument Publishing Co. Pittsburgh Pa., 1949 pgs. 232– 237 TP859 B3

*Primary Examiner*—Wilbur L. Bascomb, Jr.
*Attorney*—Michael S. Striker

ABSTRACT: A method of manufacturing a distilling bubble plate column to be used in various laboratory techniques. The column is made from a plain glass tube which is successively and locally preheated, whereupon it is shaped by means of a shaping mandrel inserted step by step thereinto to build alternating bottlenecks and broad sections thereon, said bottlenecks serving as saddles for centrally perforated column trays providing each with a drain pipe for off downward flow of the liquid through the column while vapors pass the column in the counterflow direction through portions between the inner column wall and the edge of said loosely located trays which are out of contact with each other.

LABORATORY DISTILLATION COLUMN WITH FREELY MOVEABLE BUBBLE PLATES

BACKGROUND OF THE INVENTION

The present invention relates to a laboratory distilling bubble plate column and a method of manufacturing the same.

It is already known that in various laboratory technique it is very frequently necessary to separate substance mixtures from one another by distillation. For this purpose, distilling columns are used, which, on principle, be divided into two basic categories, i.e. the so-called packed columns and bubble plate columns. The former are of a relatively simple design, consisting as a rule of a glass tube filled up with a suitable packing, such as, for example, Berle saddles, porcelain beads, metallic spirals and the like. Among disadvantages of the aforesaid column type, there have to be named relatively long-termed equilibrium establishing, a considerable pressure gradient, liability of being flooded and, finally, the necessity to carry out the distilling process very slowly. By using the last-mentioned column type, the results of distillation depend upon usually very expensive ancillary devices to stabilize the processing conditions.

An advantage of the latter column type, that is bubble plate column, consists in that it is not too sensitive to varying distilling conditions. It possesses high efficiency, high rate of flow and delivers the desired components in a relatively short time. Likewise the period of establishing the equilibrium of the liquid/steam phases is short. Nevertheless, the bubble plate columns are rather complicated in design and expensive to manufacture. The bubble plate distilling column types, as conventionally used, have to be laboriously prepared by successively pulling various intricate elementary units ever one another to obtain a sufficiently effective column assembly. All the welds and joints connecting the individual column elements to one another are very difficult to make. Furthermore, the columns have to be made from high grade hard glass. It is necessary to manufacture them in a single part production which cannot be mechanized on any stage. It is why the aforesaid column types are produced on a limited scale, and recently they are not available on the market.

The bubble plate distilling columns, however, have also some operational shortcomings. Thus, for instance, the steam, when passing upwards from the lower tray to the upper one through a liquid layer, will not, as a rule, be sufficiently dispersed into minute bubbles, which fact leads to a deceleration of the equilibrium establishment. The individual trays are, namely, connected here to each other by means of S-shape pipes through which the liquid flows in counterflow direction respective to that of the steam passage, i.e. from upper tray down to the lower one, compensating thus, due to its weight, a pressure gradient on the tray so that said branch communications are barred for the gaseous phase passage. It is an disadvantage of the aforesaid tubular connections that they are arranged eccentrically, which arrangement reduces the possibility of housing the columns into a protective heat-stabilizing jacket. Furthermore, in anomalous distilling operations, such as, for example, latent ebullition, the liquid phase can be overpressed so as to pass from the lower (plate) tray to the upper one, which results in unbalancing the thermal conditions on the tray and in deteriorating of the distillation product. The design of this column type is disadvantageous even from the operation safety standpoint, the joints and welds on the column being heat stressed so that the column may crack in operation, and consequently cause fire, explosion, or injury to the operator.

The purpose of the present invention and the basic object of the same is to overcome the aforementioned disadvantages and to significantly improve the distilling bubble plate column as well as the method of manufacturing the same.

SUMMARY OF THE INVENTION

In accordance with one feature of our invention we provide a laboratory distilling bubble plate column which consists of a tube or column, in narrowed portions of which there are loosely inserted plates constituting the column trays. The plates are provided with central apertures co communicating with drain pipes, and the base tube is shaped in the placed of contact between the wall thereof and the edge of the individual plates as to allow the upward passage for vapors.

Another feature of the present invention consists in that on the lowermost extremity of the drain pipe there is provided a closing bowl with peripheral channel, which bowl is fastened to the drain pipe.

It is an other object of the invention to provide an improved method of manufacturing a laboratory distilling bubble plate column as hereinbefore described, which comprises sealing the tube on one of its ends, preheating it at the place to shaped, inserting a mandrel thereinto, shaping the tube as to correspond to the mandrel form, removing the mandrel therefrom, and placing a plate constituting the column tray on to a saddle provided by shaping, the procedure being repeated several times till the entire tube length is completely shaped.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with accompanying drawings.

DESCRIPTION OF THE PREFERRED EMBODIMENTS

Figure 1:
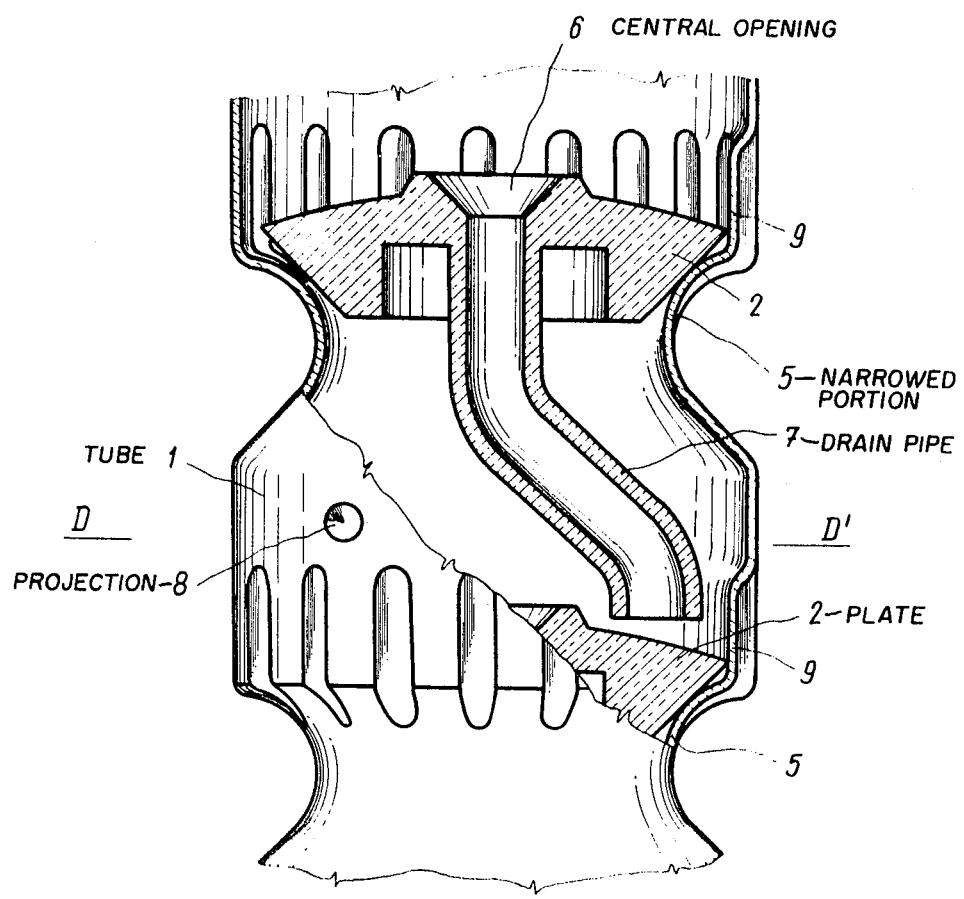
FIG. 1 is a fragmentary view, partially in vertical section, of one embodiment of a laboratory distilling bubble plate column.

Discussing now the drawing in detail, and firstly FIG. 1 thereof, it will be seen that reference numeral 1 identifies a glass tube, into narrowed portions 5 of which there are loosely inserted plates 2 constituting the column trays, said plates 2 being prevented from falling out by means of projections 8 provided on the inner wall of the tube 1. Above the narrowed portions thereof, the tube 1 is shaped so as to allow the vapors to pass, on their upward movement through the tube, over places between the inner tube wall and the plate edge which are out of contact with each other. In their central portions the plates 2 are provided each with an aperture 6 discharging into a drain pipe 7 closed at its opposite extremity by liquid seal.

Figure 2:
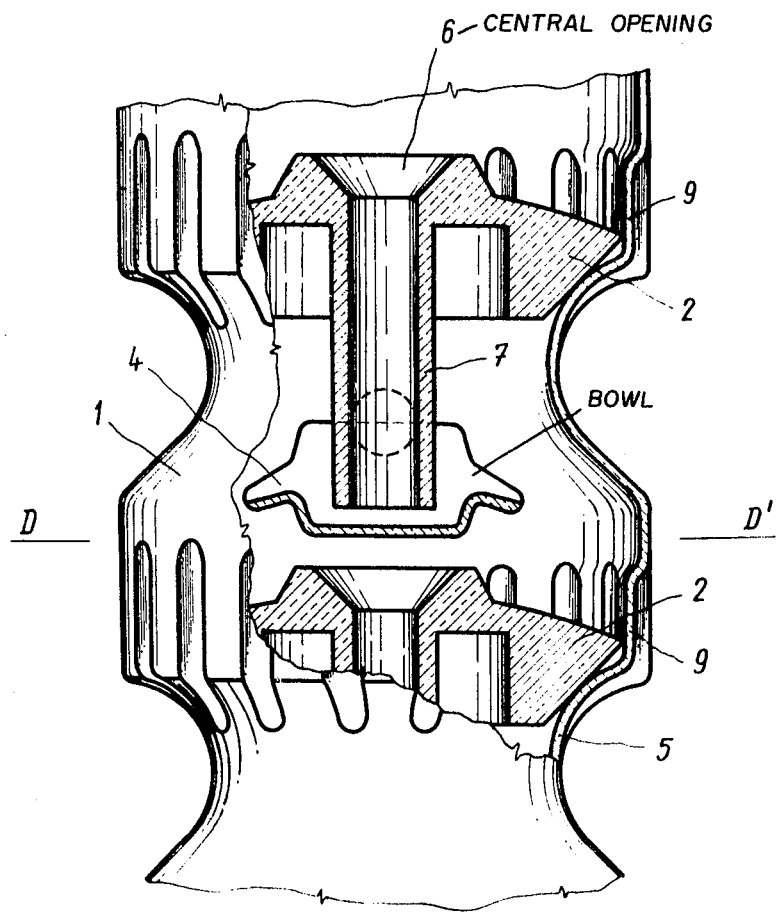
FIG. 2 is a similar view showing a modified embodiment of the column.

An other embodiment of the column according to the invention is illustrated in FIG. 2. Analogously as shown in FIG. 1, the column consists of the tube 1, into narrowed portions there are inserted freely movable plates 2. The plates 2 are provided with central apertures 6 communicating each with the drain pipe 7 which has a bowl 4 connected thereto, said bowl 4 being provided with a peripheral channel for liquid outflow.

Figure 3:
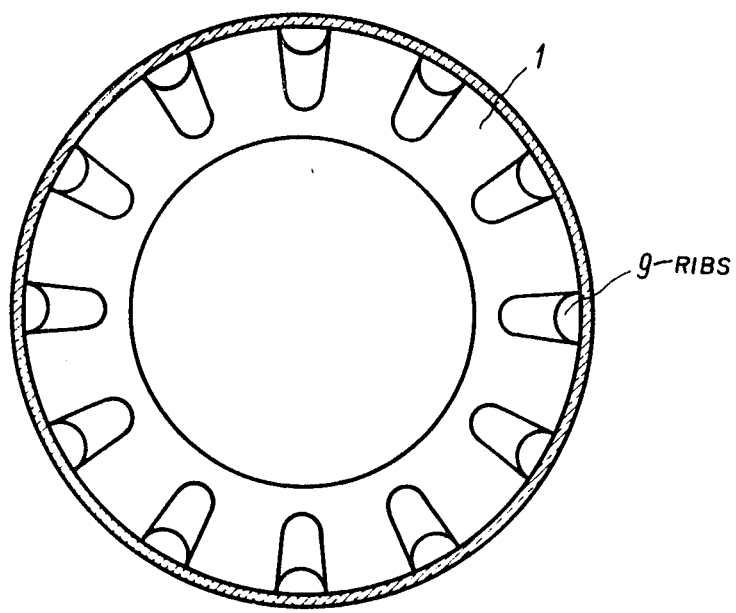
FIG. 3 is a cross-sectional view of the distilling bubble plate column according to the present invention.

FIG. 3 showing the column in a cross-sectional view, illustrates by way of example one of many possible shapes of the ribs 9 of the tube 1 above the narrowed portions thereof.

The laboratory distilling bubble plate columns according to the present invention are manufactured in that the individual trays are built by successively partitioning the tube 1 with freely inserted plates. The manufacturing process consists in that into the tube of which one open end is sealed, a mandrel is inserted, the respective tube portion heated and shaped under pressure to correspond to the mandrel form. Then the mandrel is removed, and into the saddle prepared in this way there is located a plate constituting the column tray. The procedure will be repeated several times till the entire tube length is completely shaped. Finally, the distilling column is housed into a vacuum jacket. The procedure of manufacturing the distilling column will better be understood from the following

EXAMPLE OF A SPECIFIC EMBODIMENT

A glass tube 1 having a diameter of about 35 millimeters and length of about 1,200 millimeters is heat drawn to point and sealed. Into the tube, adjacent the sealed portion thereof, a shaping mandrel is inserted. The respective tube portion will then be heated and shaped under pressure to correspond to the mandrel form. Afterwards, the mandrel is removed. Into the narrowed portion 5 of the tube 1 obtained in this way, there is placed the plate 2, as may be seen in FIGS. 1 and 2. The mandrel is then inserted again up to said plate and the procedure will be repeated several times till the entire tube length is formed. The plates 2 are arranged with a free play in the tube interior and are prevented from falling out by projections 8 provided on the inner tube wall (see FIG. 1). Finally, the column will be housed into a vacuum jacket.

The plates (FIGS. 1 and 2) are made from tubular blanks of about 18 millimeters diameter, which are preheated and flared out by means of graphite shapers to be given the desired saddle configuration. To the central portion of the plate 2, which is perforated, the drain pipe 7 is sealed, having a diameter of 5 and length of about 20 millimeters. The drain pipe 7 for the liquid may, optionally, be terminated in a bowl 4 sealed thereto (see FIG. 2). It is an advantage of the laboratory distilling bubble plate column according to the present invention that the coarrangement of the tube and the plates enable the vapors to ascend through the tube over the places between the inner tube wall and the plate edges which are out of contact with each other as well as the liquid to flow downwards through the aforesaid central communications provided with liquid seals through which the liquid falls in droplets. To build the trays, no welds, seals or other joint types are needed.

The hereinbefore described arrangement makes it possible to construct a highly efficient distilling bubble plate column from simple constituents, from conventional hard glass, to manufacture columns according to the invention in an easy way by utilizing machines, to remove the troublesome welds, to reduce the entire surface area, and to enhance the safety of operation. Furthermore, it is possible to arrange the column so that the passage of the liquid from the lower tray to the upper one is absolutely prevented, to place more bubble plate elements per length unit than is possible with ordinary types of cap columns, to arrange the column symmetrically, i.e. without eccentric joints, to provide it with heat protective jacket, and to operate it in ideal isothermic conditions.

Laboratory distilling bubble plate columns according to the invention have been tested by means of standard method as to the efficiency. It has been proved that with the distillation of a benzene/tetrachlormethane mixture the height of theoretical plates has the following values:

| | |
|---|---|
| packed columns—Berle saddles | 12 cm. |
| conventional bubble plate column | 5 cm. |
| bubble plate according to the invention | 4–5 cm. |

It results from the foregoing that the columns according to the present invention are at least as much as effective as ordinary cap column types, in spite of being substantially easier to make.

It will be understood that each of the elements described above, or two or more together may also find a useful application in other types of constructions differing from the types described above.

While the invention has been illustrated and described as embodied in a laboratory distilling bubble plate column and a method of manufacturing the same, it is not intended to be limited to the details shown, since various modifications and structural changes may be made be made without departing in any way from the spirit of the present invention.

Without further analysis, the foregoing will so fully reveal the gist of the present invention that others can by applying current knowledge readily adapt it for various applications without omitting features that from the standpoint of prior art clearly constitute essential characteristics of the generic or specific aspects of this invention and therefore, such adaptations should and are intended to be comprehended within the meaning and range of equivalence of the following claims.

What is claimed as new and desired to be protected by Letters Patent is set forth in the appended claims:

1. A distilling bubble plate column for laboratory use comprising an upright tube having a plurality of narrowed portions axially spaced from each other, each of said narrowed portions being provided with a plurality of circumferentially displaced ribs; a plurality of plates respectively located loosely supported and freely moveable in said narrowed portions of said tube and having each a peripheral surface abutting against the ribs of the respective narrowed portions so as to be held in place only by the abutment of said peripheral surface against said ribs and so as to form between said peripheral surface and the spaces between said ribs passages constituting the sole means for upward flow of vapors through the column, each of said plates being formed with a single substantially central opening therethrough; and a downcomer pipe connected to said opening and having a lower end adjacent the next lower plate for downward flow of liquid through said column.

2. A column as defined in claim 1, wherein each of said plates has a central upwardly projecting portion in which said central opening is formed and each of said downcomer pipes being curved so that the lower end thereof is laterally spaced from said upwardly projecting central portion of the next lower plate and located downwardly of the upper surface of the upwardly projecting portion of said next lower plate to provide a liquid seal preventing upward passage of the vapors through said pipe.

3. A column as defined in claim 1, wherein each downcomer pipe extends substantially coaxial to said tube and including a bowl-shaped member connected to the free end portion of each pipe, said bowl-shaped member having a peripheral wall spaced at least in part from the outer surface of said pipe and a bottom wall spaced from the free end of the latter so as to provide a liquid seal preventing upward passage of vapors through said pipe.